3,732,174
VULCANIZATION OF HALOGEN CONTAINING ELASTOMERS WITH THIOALKANOIC ACIDS AND THEIR SALTS AND UNCURED AND CURED PRODUCTS THEREOF
Paul P. Nicholas, Broadview Heights, Ohio, assignor to The B. F. Goodrich Company, New York, N.Y.
No Drawing. Filed Feb. 7, 1972, Ser. No. 224,318
Int. Cl. C08g 23/06
U.S. Cl. 260—2 A                                13 Claims

ABSTRACT OF THE DISCLOSURE

A new method for vulcanizing epihalohydrin elastomers employs, as essential vulcanization ingredients, (1) a thioalkanoic acid or its metal salts such as thiodipropionic acids, methylene-bis-thiopropionic acid, thiodiacetic acid and mercaptoacetic acid or the corresponding sodium or lead salts, and (2) a tertiary amine, particularly the compound 1,4-diaza(2.2.2)bicyclooctane. When the acid form of ingredient (1) is employed it is necessary to add a third component which is a metal base compound such as an alkali metal carboxylate, lead oxide, etc. When a metal salt of a thioalkanoic acid ingredient (1) such as disodium thiodipropionate is employed the third component is unnecessary. This vulcanizing system provides very fast and adjustable cure cycles producing vulcanizates of low odor and of excellent physical properties.

CROSS REFERENCES TO RELATED APPLICATIONS

My copending application, Ser. No. 224,317 of even date herewith, discloses another vulcanization system for epihalohydrin elastomers, such system including as the three required ingredients, a polythiol, a tertiary amine, and a metal base compound.

BACKGROUND OF INVENTION

The epihalohydrin elastomers are relatively recently developed specialty rubbers exhibiting when vulcanized excellent strength and elasticity, high oil resistance, excellent resistance to oxidation and attack by ozone, the highest known resistance to air or gas diffusion (homopolymers of epichlorohydrin) and both excellent physical properties and high oil resistance at low temperatures (copolymers of epichlorohydrin and an alkylene oxide). These elastomers have been vulcanized heretofore, see U.S.P. 3,026,270, by polyamines, polyamine salts, polyamine carbamates, and metallic oxides which are believed to function by displacing halogen from the elastomer chains and generating nitrogen-containing crosslinks. Sometimes, as is disclosed in U.S.P. 3,026,305, an alkyl thiuram disulfide, thiazole, dithiocarbamate or other conventional rubber accelerator-type compound is employed along with a polyamine. U.S.P. 3,341,491 and 3,414,529 shows a mixture of respectively, a metal oxide such as red lead or a diazabicyclo compound such as triethylenediamine and a mercaptoimidazoline compound in the vulcanization of epihalohydrin elastomers. Most, if not all, of these curing systems have drawbacks such as slow cures, high water extractability and swell, poor scorch characteristics, and mold sticking. The application of these excellent elastomers has been somewhat retarded by reason of the shortcomings of available vulcanization systems. Better vulcanization systems for the epihalohydrin elastomers are badly needed.

SUMMARY OF INVENTION

These and still other objects are achieved in the present invention which provides an improved method of vulcanizing elastomers selected from the class consisting of the epihalohydrin and chloroprene elastomers.

The method of this invention comprises mixing an elastomer selected from the class consisting of epihalohydrin elastomers and neoprene rubbers with (a) an ingredient selected from the class consisting of thioalkanoic acids as defined below and their metal salts, (b) a tertiary amine ingredient having low volatility at elevated vulcanization temperatures and especially the compound, 1,4-diaza (2.2.2)bicyclooctane, and when ingredient (a) is the acid form, (c) a metal base compound. Ingredient (c) may optionally be added even when the curative agent is a salt. Illustrative metal base compounds are monovalent and polyvalent metal salts of carboxylic acids such as sodium acetate, sodium acrylate, the calcium, zinc, magnesium, lead and tin stearates, and others; and polyvalent metal oxides such as lead oxides including litharge, red lead, etc. The most important attributes of the salt form of ingredient (a) are their nearly odorless character and their high activity permitting vulcanization times as short as one to ten minutes at 300–425° C. with relatively low curative levels. Because of their low odor, this preferred class of curatives are readily accepted by rubber mixing and curing personnel and the resulting vulcanizates are acceptable to the public.

The tertiary amine ingredient (b) above very greatly accelerates the vulcanization reaction. Suitable tertiary amines include N,N-dimethylpiperazine, 3-ethyl-4-methyl pyridine, and 1,4-diaza(2.2.2)bicyclooctane, with the latter compound being by far the most active.

The vulcanization reaction of this invention has another advantage in that it occurs at temperatures conventionally employed by the rubber industry in the conventional sulfur vulcanization of the more common highly-unsaturated natural and synthetic rubbers. Temperatures between about 275° and about 425° F., more preferably from about 300° to about 410° F. may be employed but the range of from about 300° to about 390° F. is most preferred.

DETAILED DESCRIPTION

Elastomers

The curing system of this invention has been found effective with halogen-containing elastomers selected from the class consisting of (1) epihalohydrin elastomers prepared by the polymerization of an epihalohydrin as defined more fully below and (2) neoprene elastomers prepared by the polymerization of chloroprene.

Any of the neoprene rubbers which are polymers of chloroprene made by the polymerization, usually in aqueous emulsion, of chloroprene, with or without small proportions of other comonomers and/or modifiers, respond readily to the curing system of this invention.

Epihalohydrin elastomers

The epihalohydrin elastomers which may be employed in this invention are the rubbery, high molecular weight polymers of an epihalohydrin containing halogen atoms of atomic weight above 19, that is epichlorohydrin, epibromohydrin, and epiiodohydrin both in the homopolymeric and copolymeric forms. Such elastomers are prepared by polymerization of the epihalohydrin containing monomeric material in mass or in solution with organometallic catalysts such as the hydrocarbon aluminum or hydrocarbon zinc catalysts. These elastomers, especially the epihalohydrin homopolymers, can be produced in both amorphous and crystalline forms and also as a mixture of the amorphous and crystalline form, depending mainly on the catalyst utilized. For use as an elastomer, the wholly amorphous and mixed forms low in crystallinity are much preferred. Copolymers or an epihalohydrin with an epoxide comonomer, for example a copolymer of epichlorohydrin with an alkylene oxide such as ethylene oxide, are nearly completely amorphous and highly rubbery in nature.

Polymerization of the epihalohydrin takes place through the epoxide groups so that the polymer has a polyether structure in which there are repeating halomethyl pendant groups thusly

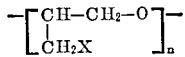

where X is a halogen of atomic weight greater than 19. In the same way, when the epihalohydrin is copolymerized with one or more other epoxides, including those which contain unsaturated carbon-to-carbon structures, polymerization is believed to take place mainly through opening of the epoxide linkages.

Typical epoxide monomers which may be copolymerized with the epihalohydrin monomer to produce elastomeric copolymers useful in this invention are the already-mentioned alkylene oxides including ethylene oxide, propylene oxide, butene oxides, butadiene monoxide, cyclohexene oxide, vinyl cyclohexene oxide, epoxy ethers such as ethyl glycidyl ether, 2-chloroethyl glycidyl ether, allyl glycidyl ether, and others. In general, the elastomer may contain in combined form from about 10% to about 99%/wt. of the epihalohydrin and from about 90% to about 1%/wt. of the epoxide comonomer. More preferred are the homopolymers of epichlorohydrin and the copolymers containing from about 1% to about 40%/wt. of the comonomer or comonomers in combined form with the remainder being combined epichlorohydrin. Most preferred, of course, are the homopolymers of epichlorohydrin and copolymers of epichlorohydrin containing from abount 1 to 40%/wt. of ethylene oxide.

The epihalodrin elastomers to be elastomeric must be high in molecular weight. By this is meant a polymer evidencing a reduced solution viscosity ("RSV") of at least 0.2, more preferably 0.5 or more, as determined employing 0.1 gram of the polymer dissolved in 100 ml. of alpha-chloronapthalene as measured at a solution temperature of 100° C. Stated another way, the epihalohydrin polymer to be elastomeric must be solid in nature evidencing a weight average molecular weight of at least 200,000 and a Mooney viscosity of at least 25 ML, as determined after 4 minutes at 212° F. employing the large (4-inch) rotor.

Thioalkanoic ingredient

As indicated above, this ingredient is selected from the class consisting of certain thioalkanoic acids and their metal salts. Due to confusing nomenclature in the literature applied to compounds of this type, we shall, for the purposes herein, adopt a definition wherein the general term "a thioalkanoic acid" as applied to this invention means a carboxylic acid having the structure

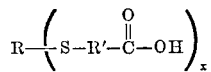

where $x$ is a number at least 1 (usually 1 to 4), R' is an alkylidene hydrocarbon group wherein not more than two consecutively-connected carbon atoms intervene between the sulfur atom and the carbonyl carbon atom, and R is a radical selected from the class consisting of hydrogen when $x=1$ and multivalent organic bridging groups when $x$ is greater than 1. Thus, the above definition includes structures containing the thioacetic acid

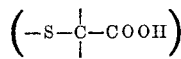

and thiopropionic acid

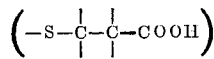

groups with or without pendant side-chain hydrocarbon substituents on the indicated free valences of the carbon atoms. Multivalent organic bridging groups (R) can be methylene (—CH$_2$—), ethylidene (—CH$_2$—CH$_2$—), or isopropylidene

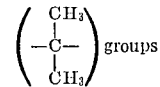

the various butylidene groups, aromatic-substituted alkylidene hydrocarbon bridging groups polyvalent aromatic bridging groups, such as the phenylene group, and other still more complex groups to which are attached the thioacetic and thiopropionic acid groups.

The above definition of thioalkanoic acids includes mercapto-substituted acetic and propionic acids (R is H, $x=1$), as well as poly(thioacetic)

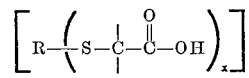

and poly(thiopropionic) acids

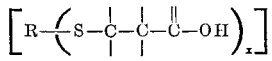

where R is a hydrocarbon bridging group such as the methylene (—CH$_2$—) group and $x >1$. Preferred are thioalkanoic acids containing 2 or more thiopropionic acid (—S—CH$_2$—CH$_2$—COOH) groups per molecule.

More preferred are the metal salts of the thioalkanoic acids as defined above. The metal moiety of such salts can be a monovalent metal such as any of the alkali metals or it may be any of the polyvalent metals which form salts with carboxylic acids such as lead, zinc, magnesium, calcium, barium, etc.

The main advantage of the salt forms of the thioalkanoic ingredient is their nearly odor-free character and the elimination of the metal base ingredient.

Most preefrred are the lead salts of the thioalkanoic acids as defined above. Vulcanizates prepared from such lead salts evidence lower water-sensitivity and water swell than do those prepared from the corresponding alkali metal salts. This may be the result of the marked difference in water solubility of the corresponding metal halides which may form during cure.

Thioalkanoic acids which may be utilized per se or in the form of salts in the vulcanization system of this invention include mercapto-substituted monocarboxylic acids such as mercaptoacetic acid also sometimes referred to as thioglycolic acid

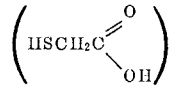

2-mercapto propionic acid, 3-mercapto propionic acid, 3-mercapto-2-methyl propionic acid, 2-mercaptomethyl-3-methyl butanoic acid, and many others.

There also may be utilized thioalkanoic acids such as thiodiacetic acid [S(CH$_2$COOH)$_2$], thiodipropionic [S(CH$_2$CH$_2$COOH)$_2$] acid, methylene-bis-thiopropionic acid [CH$_2$(SCH$_2$CH$_2$COOH)$_2$], ethylidene-bis-thiopropionic acid [CH$_2$CH$_2$(SCH$_2$CH$_2$COOH)$_2$], methylene-bis-3-thiobutanoic acid

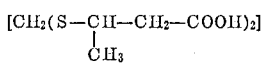

and many others.

Illustrative alkali metal salts of the thioalkanoic acids include sodium thioglycolate which also can be referred to as sodium mercaptoacetate, the sodium and potassium 2-mercapto propionates, the sodium and potassium 3-mercapto propionates, disodium thiodipropionate, disodium methylene-bis-thiopropionate, disodium thiodiacetate, disodium methylene-bis-thioacetate, and many others.

The preferred polyvalent metal salts of thioalkanoic acids are lead(II) thiodipropionate, lead(II) methylenebis-thiopropionate, lead(II) thiodiacetate, 3-thiopropionato lead(II)

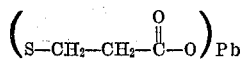

thioacetato lead(II)

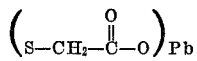

and the corresponding zinc, magnesium, calcium and other polyvalent metal salts.

The lead salts of thioalkanoic acids may be prepared by reacting a solution of a soluble divalent lead salt with an alcoholic solution of the thioalkanoic acid. For example, (divalent) lead(II) salt of methylene-bis-thiopropionic acid is prepared by adding gradually a solution containing 33.6 grams (0.15 mole) of methylene-bis-thiopropionic acid to a solution containing 133 grams (0.35 mole) of lead acetate dihydrate dissolved in a mixture of 300 ml. of methanol and 300 ml. of water with vigorous agitation. A white, sticky precipitate forms rapidly. Stirring is continued until the precipitate hardens and becomes more grainy in texture. The precipitate is then filtered off, washed with water and dried to constant weight. A yield of about 81% of the desired salt (based on the acid) is obtained which analyzes as containing 47.3%/wt. of lead (48.2% theoretical) and which melts at 176–181° C. (dec.).

Amine ingredient

Nearly any tertiary amine may be employed having low volatility at mixing temperatures up to about 250 or 275° F. Thus, such divergent amines as N,N-dimethyl piperazine, 3-ethyl-4-methyl pyridine, and 1,4-diaza (2.2.2)bicyclooctane may be utilized. Cure times and scorch times will vary according to the effectiveness of the particular tertiary amine and the proportions employed. By far the most active amine is 1,4-diaza(2.2.2) bicyclooctane and this compound is strongly preferred.

Metal base ingredient

Nearly any basic or alkaline metal-containing compound may be employed as the metal base compound. This ingredient is required only when the acid form of the thioalkanoic acid curing agent is employed. Thus, there may be utilized monovalent alkali metal carboxylates such as sodium or potassium acetate, sodium propionate, sodium acrylate, sodium palmitate, sodium stearate, potassium oleate, sodium phthalate and many, many others. Another highly useful group of compounds for this purpose are polyvalent metal oxides such as those of lead, zinc, magnesium, barium and calcium and salts of these and other polyvalent metals with carboxylic acids such as red lead, zinc oxide, barium stearate, lead stearate and the like. It is sometimes preferred to employ the polyvalent metal oxides and/or salts of the metal which forms water-insoluble or sparingly-soluble halide salts. Best among the latter are lead oxides and/or lead carboxylates, particularly litharge, red lead, lead oleate, lead stearate, and many others.

In addition, still other metal bases include the tin oxides, germanium oxides, calcium oxide, calcium carbonate, lead orthosilicate, barium silicate, cadmium silicate, magnesium silicate, magnesium oxide, magnesium benzoate, calcium benzoate, dibasic lead phosphite, magnesium phosphite, and many others.

PROPORTIONS

Metal base

In general, the metal base ingredient should be added in amounts from about 1 to about 10 parts/wt., more preferably from about 1.5 to about 5 parts/wt., of the base per 100 parts/wt. of the elastomer content of the composition.

Thioalkanoic acid

I have found that as little as 0.001 mol of a difunctional thioalkanoic acid or salt thereof per 100 parts/wt. of the elastomer produces a vulcanizate. More practical considerations such as a suitable compromise between scorch times and commercially-feasible cure cycles of from about 1 to about 60 minutes will require at least about 0.005 mol of the difunctional curative per 100 parts/wt. of the elastomer. "Hard rubber" vulcanizates may require up to 0.03 mol or more of the curative per 100 parts/wt. of elastomer. Usually from about 0.007 to about 0.02 mol for every 100 parts/wt. of elastomer will be sufficient for most purposes. These levels may be reduced somewhat with thioalkanoic ingredients with greater functionality (X>2).

Amine proportions

The amine ingredient (ingredient (b) above) may be added in any proportion from about 1 part/wt. or slightly less for every 100 parts/wt. of elastomer in the composition to as much as about 5 parts/wt. or more, for every 100 parts/wt. of elastomer. More preferred proportions are from about 1 to about 4 parts/wt. for every 100 parts by weight of elastomer. The larger proportions produce faster vulcanization rates but the cure rate does not go up directly with increasing amine proportions. Since quite rapid cures are obtainable with the lower proportions, and since the higher amine proportions may increase water sensitivity of the vulcanizate, the use of as little amine as possible consistent with the desired vulcanization rate is preferred.

Other compounding ingredients

The vulcanization system of this invention is tolerant of the usual rubber compounding ingredients which are neutral and/or not strongly acidic in reaction such as fillers, pigments, colorants, reinforcing carbon blacks, extender and processing oils, lubricants, tackifiers, antioxidants, antiozonants, and the like. Such compounding ingredients may be employed in the usual proportions for the usual purposes.

Processing

The elastomer may be mixed with the curing ingredients of this invention at any temperature of about 250° F. or below without scorch. A better procedure is first to premix the elastomer with all of the compounding ingredients other than curatives at any temperature up to about 300° F. and with the vigorous mixing required to achieve best dispersion of the dry and powdery ingredients and then in a second step add the curatives at the above specified lower temperatures. Such operations may be carried out on a two roll rubber mill and in internal mixers such as the Banbury mixer.

Vulcanization

The curing system of this invention requires temperatures above about 250° F. for activation of cure. Cure rates are quite slow below about 300° F. so it is preferred to heat the composition, usually in a mold, at temperatures between about 300° and about 425° F., more preferably from about 300 to about 390° F. In the latter range, vulcanization reaches optimum levels in from about 1 to about 45 minutes with wide variations in curative levels.

Cure rate studies

For the purposes herein, the cure or vulcanization of the elastomers according to the present invention is demonstrated in two different ways. One is the classical method wherein the elastomer is compounded, mixed, vulcanized and then subjected to the usual stress-strain type testing demonstrating the usual highly elastic behavior of well-vulcanized rubbers. More revealing of scorch times, cure rates, optimum vulcanization and overcure or reversion and the behavior of the stock during these phases is to effect the cure in the oscillating rotor Viscurometer (see U.S. reissue patent 26,562 issued to J. R. Beatty and Paul W. Karper) wherein a sample of the stock is worked between the rotor and static work pieces while being maintained at a constant temperature. In the examples to follow, there are reported the thus determined scorch time ($T_s$ or time for torque to increase 2 in.-lbs.) and $\Delta T$ or torque increase over the time interval stated.

In some cases, a $T_c$ value is presented, $T_c$ being the time to optimum cure. Optimum cure is by definition the time when 90% of maximum torque is developed in the Viscurometer. The latter value can be read from the Viscurometer torque/time profile chart. In these studies, the stock in the Viscurometer cavity is maintained at about 310°. The rotary deflection of the rotor in all cases is ±60.

The invention will now be demonstrated in several specific examples which are intended as being illustrative only and not as limiting in any way.

EXAMPLE I

In this example, there is employed a commercially-available elastomeric homopolymer of epichlorohydrin known as "Hydrin 100" (Registered T.M. The B. F. Goodrich Company, Akron, Ohio; this rubber being produced and distributed by the B. F. Goodrich Chemical Company, Cleveland, Ohio). Such homopolymer exhibits a Mooney viscosity of at least about 60 ML after 4 minutes @ 212° F. and a specific gravity of about 1.36 @ 25° C. Such elastomer is mixed with carbon black and the ingredients of the curing system on a two-roll laboratory rubber mill employing the simple laboratory recipe given below. In this example, a number of the sodium salts of various thioalkanoic acids are compared to several similar ordinary carboxylic acid salts as to scorch times ($T_s$) and cure rates all employing the same amine ingredient (1,4-diaza(2.2.2)bicyclooctane).

Material: Parts/wt.
- Hydrin 100 _____ 92.5.
- Sodium salt _____ Variable.
- N550 carbon black _____ 27.7.
- Amine _____ 3.20 (.0286 mol).

The above materials are mixed starting with the elastomer only on the mill rolls which are at room temperature initially and allowing about one minute for the rubber to band. The stock temperature is monitored so that it never goes above about 250° F. The carbon black is then added and after the black is all incorporated, the stock is twice removed from the rolls, the rolls opened slightly and then the stock returned thereto for several end passes. The stock is then again banded on the slow roll. The curative agents are then added slowly while keeping the stock cool and ending with several end passes whenever possible. The stock is then sheeted off and samples die cut out of the uncured sheet for Viscurometer testing. The results are indicated below.

| Exp. No. | Curative | Parts/wt. (mol)[1] | $T_s$ (min.) | $\Delta T$ | Time (min.) |
|---|---|---|---|---|---|
| 1 | Disodium methylene-bis-thiopropionate. | 2.51 (0.00935) | 1.2 | 131 | 12 |
|   |   |   |   | 147 | 20 |
|   |   |   |   | 154 | 24 |
| 2 | Disodium thiodipropionate. | 4.15 (0.0187) | 2.5 | 130 | 12 |
|   |   |   |   | 174 | 20 |
|   |   |   |   | 201 | 24 |
| 3 | Disodium methylene-bis-thioacetate. | 4.50 (0.0187) | 2.3 | 138 | 12 |
|   |   |   |   | 163 | 20 |
|   |   |   |   | 173 | 24 |
| 4 | Disodium thiodiacetate. | 3.63 (0.0187) | 2.8 | 74 | 12 |
|   |   |   |   | 128 | 20 |
|   |   |   |   | 134 | 24 |
| 5 | Sodium thioglycolate (sodium mercapto-acetate). | 2.13 (0.0187) | 1.1 | 135 | 12 |
|   |   |   |   | 160 | 20 |
|   |   |   |   | 164 | 24 |
| 6 | Sodium 3-mercapto-propionate. | 2.4 (0.0187) | 1.1 | 128 | 12 |
|   |   |   |   | 142 | 20 |
|   |   |   |   | 151 | 24 |

See footnote at end of table.

| Exp. No. | Curative | Parts/wt. (mol)[1] | $T_s$ (min.) | $\Delta T$ | Time (min.) |
|---|---|---|---|---|---|
| 7 | Disodium adipate (control). | 3.56 (0.0187) | 3.2 | 37 | 12 |
|   |   |   |   | 98 | 20 |
|   |   |   |   | 120 | 24 |
| 8 | Sodium acetate (control). | 3.07 (0.0374) | 3.2 | 55 | 12 |
|   |   |   |   | 84 | 20 |
|   |   |   |   | 93 | 24 |
| None. (Control) | | | 3.2 | 36 | 12 |
|   |   |   |   | 59 | 20 |
|   |   |   |   | 68 | 24 |

[1] In above recipe.

The above data starting with last control experiment shows a mild cure due to amine ingredient. The next two controls employing disodium adipate and sodium acetate show a very minor change in cure for each nonthio salt. However with all of the disodium salts of thioalkanoic acids in the above experiments, the scorch times are reduced markedly and much higher cure rates are demonstrated. The state of cure at 12 minutes is greater than the best of the controls at 24 minutes. This is true even in experiment No. 1 where the curative level is one-half (0.00935 mol) the level of disodium adipate. In these and other experiments, the same sodium thioalkanoic curatives are demonstrated as being capable of producing optimum cures in cure cycles of 10 minutes or less at 310° F.

In a black free control experiment similar to experiment (1) above, only that composition containing both disodium methylene-bis-thiopropionate and amine gave a cure.

EXAMPLE 2

The procedures of the preceding example are repeated employing the same standard recipe except for the substitution of a lead salt curative for the disodium salt ingredient. The 310° F. Viscurometer data are as follows:

| Exp. No. | Curative | Parts/wt. (mol) | $T_s$ (min.) | $\Delta T$ | Time (min.) |
|---|---|---|---|---|---|
| 1 | Lead(II) methylenebis-thiopropionate. | 4.02 (0.00935) | 1.2 | 154 | 12 |
|   |   |   |   | 174 | 20 |
|   |   |   |   | 184 | 24 |
| 2 | Lead(II) thio-dipropionate. | 7.17 (0.0187) | 1.2 | 155 | 12 |
|   |   |   |   | 191 | 20 |
|   |   |   |   | 206 | 24 |
| 3 | 3-propionato lead(II) (SCH$_2$CH$_2$CO$_2$)Pb. | 5.82 (0.0187) | 2.5 | 138 | 12 |
|   |   |   |   | 182 | 20 |
|   |   |   |   | 209 | 24 |
| 4 | 2-thioacetato lead(II) (SCH$_2$CO$_2$)Pb. | 5.58 (0.0187) | 1.6 | 146 | 12 |
|   |   |   |   | 188 | 20 |
|   |   |   |   | 202 | 24 |

In the above data, the lead salts are seen to be very active curatives producing very highly vulcanized (tightly cured) products in 12 minutes or less at 310° F.

EXAMPLE 3

In this example, other tertiary amines are evaluated as replacements for the 1,4-diaza(2.2.2)bicyclooctane employed in the recipe of the preceding examples. In each case, a constant proportion of 2.51 parts/wt. (0.00935 mole) of the disodium thiodipropionate curative is employed. The Viscurometer data are as follows:

| Exp. No. | Amine ingredient | Parts/wt. (moles) | $T_s$ (min.) | $\Delta T$ | Time (min.) |
|---|---|---|---|---|---|
| 1 | 1,4-diaza(2.2.2)bicyclo-octane. | 3.20 (0.0286) | 1.25 | 131 | 12 |
|   |   |   |   | 147 | 20 |
|   |   |   |   | 154 | 24 |
| 2 | N,N-dimethyl-piperazine. | 3.26 (0.0286) | 15.4 | 96 | [1] 41 |
| 3 | 3-ethyl-4-methyl pyridine. | 3.61 (0.0286) | 4.2 | 93 | [1] 19.5 |

[1] Optimum cure time.

The above data indicate that the preferred 1,4-diaza (2.2.2)bicyclooctane is more active than the other amines tested. However, the 3-ethyl-4-methyl pyridine affords longer scorch times yet is sufficiently active to yield an optimum cure time of 19.5 minutes. The latter amine would be useful in curing compositions of thick cross-section. The Viscurometer profiles (plot of torque vs. time) for the above and other vulcanizates of this invention show no reversion (decrease in torque with continued cure).

EXAMPLE 4

In this example, the free acid forms of a number of thioalkanoic acids are evaluated first without a metal base and second with litharge (5 parts/wt.) as the metal base in a composition comprising 92.5 g. of Hydrin 100, 27.7 g. N550 carbon black, and 3.0 g. 1,4-diaza(2.2.2)bicyclooctane. The Viscurometer data and Monsanto Rheometer data are as follows:

| Exp. No. | Acid form curative | Parts/wt. (moles) | 310° F. Viscurometer | | |
|---|---|---|---|---|---|
| | | | $T_s$ | $\Delta T$ | Time |
| 1 | Methylene bis-thiopropionic acid (no litharge). | 2.09 (0.00935) | 5.0 | 27 / 58 / 71 | 12 / 20 / 24 |
| 2 | Thiodipropionic acid (no litharge). | 3.33 (0.0187) | 5.1 | 17 / 42 / 54 | 12 / 20 / 24 |
| 3 | 3-mercaptopropionic acid (no litharge). | 1.12 (0.0187) | 4.8 | 22 / 48 / 60 | 12 / 20 / 24 |
| | | | Monsanto Rheometer at 310° F. | | |
| 4 | Methylene bis-thiopropionic acid (litharge). | 5.0 | 2.2 | 89 / 152 | 10 / 40 |
| 5 | Thiodipropionic acid (litharge). | 4.0 | 3.7 | 73 / 161 | 10 / 40 |

As will be seen, the cure is slow when the free acid form curatives is employed without a base ingredient. With litharge, however, the vulcanization is fairly rapid and proceeds to a very high state of vulcanization.

The thioalkanoic acid (acid form) curatives and several sodium and lead thioalkanoic acid salts are again evaluated in Hydrin 100 elastomer employing the recipes given below. The compositions are cured 10 minutes at 310° F. and the resulting vulcanizates evaluated by conventional stress-stain and other procedures (all ASTM procedures).

310° F. and the resulting ASTM sheets subjected to stress-strain testing. The data are as follows:

RECIPES—PARTS/WT.

| Material: | Experimental Composition No. | | | | | | |
|---|---|---|---|---|---|---|---|
| | 1 | 2 | 3 | 4 | 5 | 6 | 7 |
| Hydrin 100 | 100 | 100 | 100 | 100 | 100 | 100 | 100 |
| N550 carbon black | 30 | 30 | 30 | 30 | 30 | 30 | 30 |
| Lubricant | 1 | 1 | 1 | 1 | 1 | 1 | 1 |
| LMBTP [1] | 1.5 | 4.5 | 1.5 | 4.5 | 1.5 | 3 | 4.5 |
| Amine [2] | 1 | 1 | 2.5 | 2.5 | 4 | 4 | 4 |
| Stress-Strain, Mooney Scorch-LR, 250° F.: | | | | | | | |
| Minimum | 42 | 40 | 39 | 40 | 41 | 44 | 42 |
| Δ 5 minutes | 10.5 | 14.5 | 4.5 | 5 | 3.5 | 3 | 4 |
| Δ 30 minutes | 16.5 | 22.5 | 6.5 | 7.5 | 5.0 | 4.5 | 5.5 |
| 100% Modulus (p.s.i.) at cure time: | | | | | | | |
| 10 minutes | 170 | 190 | 340 | 630 | 630 | 830 | 1,620 |
| 20 minutes | 220 | 230 | 480 | 1,080 | 1,140 | 1,470 | |
| 30 minutes | 220 | 350 | 650 | 1,280 | | | |
| 200% Modulus (p.s.i.) at cure time: | | | | | | | |
| 10 minutes | 480 | 490 | 1,010 | 1,670 | | | |
| 20 minutes | 590 | 610 | 1,470 | | | | |
| 30 minutes | 620 | 1,050 | | | | | |
| Tensile (p.s.i.) at cure time: | | | | | | | |
| 10 minutes | 2,150 | 2,080 | 1,630 | 1,910 | 1,450 | 1,590 | 1,780 |
| 20 minutes | 2,100 | 2,290 | 1,550 | 1,930 | 1,320 | 1,470 | 1,380 |
| 30 minutes | 2,000 | 2,330 | 1,600 | 1,580 | 1,280 | | |
| Elongation (percent) at cure time: | | | | | | | |
| 10 minutes | 820 | 800 | 330 | 220 | 180 | 160 | 150 |
| 20 minutes | 740 | 730 | 220 | 160 | 110 | 100 | 80 |
| 30 minutes | 660 | 520 | 190 | 130 | 80 | | |
| Hardness (Duro. A) at cure time: | | | | | | | |
| 10 minutes | 55 | 56 | 59 | 65 | 63 | 66 | 71 |
| 20 minutes | 55 | 58 | 61 | 70 | 68 | 74 | 76 |
| 30 minutes | 57 | 61 | 64 | 71 | 73 | | |

[1] Lead salt of methylene-bis-thiopropionic acid.
[2] 1,4-diaza(2.2.2)bicyclooctane.

The above data illustrates a broad variation in cure characteristics that are possible. One can obtain a vulcanizate with good tensile strength and with elongation varying from 80 to about 900% all by suitable variation in the proportions of the curing agent and/or amine ingredients.

RECIPES—PARTS/WT.

| | Experimental Composition No. | | | | | | | |
|---|---|---|---|---|---|---|---|---|
| | 1 | 2 | 3 | 4 | 5 | 6 | 7 | 8 |
| Hydrin 100 | 100 | 100 | 100 | 100 | 100 | 100 | 100 | 100 |
| N550 black | 30 | 30 | 30 | 30 | 30 | 30 | 30 | 30 |
| Lubricant, release agent | 1 | 1 | 1 | 1 | 1 | 1 | 1 | 1 |
| Amine [1] | 3.5 | 3.5 | 3.0 | 3.5 | 3.0 | 3.5 | 3.0 | 3.0 |
| Litharge | 0 | 0 | 0 | 0 | 0 | 0 | 5.0 | 5.0 |
| $S(CH_2CH_2CO_2Na)_2$ | 4.5 | | | | | | | |
| $S(CH_2CH_2CO_2)_2Pb$ | | 7.8 | | | | | | |
| $CH_2(SCH_2CH_2CO_2Na)_2$ | | | 4.0 | | | | | |
| $CH_2(SCH_2CH_2CO_2)_2Pb$ | | | | 4.4 | | | | |
| $HSCH_2CO_2Na$ | | | | | 2.1 | | | |
| $(SCH_2CO_2)Pb$ | | | | | | 6.0 | | |
| $S(CH_2CH_2CO_2H)_2$ | | | | | | | 4.0 | |
| $CH_2(SCH_2CH_2CO_2H)_2$ | | | | | | | | 5.0 |

PHYSICAL PROPERTIES

| | 1 | 2 | 3 | 4 | 5 | 6 | 7 | 8 |
|---|---|---|---|---|---|---|---|---|
| Mooney scorch, 250° F | 4 | 4 | 3.5 | 4 | 2.5 | 5 | 4.5 | 8 |
| Percent compression set, plied disc (22 hr./212° F.) | 67 | 57 | 62 | 61 | 56 | 63 | 77 | 71 |
| Originals: | | | | | | | | |
| 100% mod | 970 | 1,700 | 850 | 1,090 | 820 | 1,620 | 1,280 | 1,000 |
| 200% mod | | | | 1,800 | | | 2,460 | 2,120 |
| Ten. (p.s.i.) | 1,020 | 1,850 | 1,930 | 2,060 | 1,800 | 1,620 | 2,460 | 2,200 |
| Elong. (percent) | 120 | 110 | 190 | 170 | 200 | 100 | 200 | 210 |
| Hard. (A) | 67 | 78 | 66 | 69 | 65 | 75 | 76 | 75 |
| Air test tube aged 70 hr./302° F.: | | | | | | | | |
| Ult. tensile (p.s.i.) | 760 | 880 | 1,150 | 480 | 180 | 740 | 1,680 | 1,330 |
| Percent ult. elong | 90 | 50 | 130 | 80 | 170 | 50 | 60 | 50 |
| Shore hard. (A) | 66 | 74 | 67 | 60 | 38 | 71 | 81 | 80 |

[1] 1,4-diaza(2.2.2)bicyclooctane.

EXAMPLE 5

The data of the preceding examples indicate the thioalkanoic acids with added base as well as the sodium the lead salts in combination with 1,4-diaza(2.2.2)-bicyclooctane are capable of producing highly vulcanized compositions in the very short cure cycle of 10 to 12 minutes at 310° F. To further demonstrate the cure system, the lead methylene-bis-thiodipropionate curative of Experiment No. 1 of Example 2 is employed in compositions cured for each of 10, 20 and 30 minutes at

EXAMPLE 6

In this example, there is utilized a commercially-available epichlorohydrin/ethylene oxide copolymer elastomer known as "Hydrin 200" (B. F. Goodrich Chemical Company, Cleveland, Ohio) in which the combined ethylene oxide content is about 35%/wt. This elastomer exhibits a Mooney viscoscity of about 100 ML after 4 minutes @ 212° F. Two thioalkanoic agents of the preceding examples, lead(II) methylene-bis-thiopropionate and disodium methylene-bis-thiopropionate are employed to vulcanize the elastomer, both employing 1,4-diaza(2.2.2) bicyclooctane as the amine. For purposes of comparison, comparable compositions employing the "Hydrin 100" of the preceding examples are included. The general recipe is 92.5 parts/wt. of elastomer, 27.7 parts/wt. of N550 carbon black, 3.20 parts/wt. (0.0286 mole) of 1,4-diaza (2.2.2)bicyclooctane and the proportion stated below of the sodium or lead(II) salts in question.

| Comp. No. | Curatives | Elastomer | $T_s$ | $\Delta T$ | Time (min.) |
|---|---|---|---|---|---|
| 1 | Na₂MBTP¹ 2.51 parts/wt. or 0.00935 mol. amine (0.0286 mol). | "Hydrin 100" | 1.2 | 131 / 146 / 154 | 12 / 20 / 24 |
| 2 | Same except Pb MBTP² 4.02 parts/wt. (0.00935 mol). amine (0.0286 mol). | do | 3.5 | 154 / 174 / 184 | 12 / 20 / 24 |
| 3 | Same as 2 | "Hydrin 200" | 2.2 | 125 / 144 / 151 / 159 | 12 / 20 / 24 / 28 |
| 4 | Same as 1 | do | 2.2 | 135 / 148 / 154 | 12 / 20 / 24 |

¹ Disodium methylene-bis-thiopropionate.
² Lead (II) salt of methylene-bis-thiopropionic acid.

The above data indicates that the epichlorohydrin copolymer elastomer vulcanized as readily as does the homopolymers of epichlorohydrin.

EXAMPLE 7

In this example, a chloroprene elastomer, "Neoprene GN" (Du Pont) is compounded as follows:

Material: Parts/wt.
Neoprene GN _____ 100.
N550 carbon black _____ 27.7.
Amine¹ _____ 3.2 (0.0286 mol).
Thioalkanoic agent² _____ 2.51 (0.00935 mol).

¹ 1,4-diaza(2.2.2)bicyclooctane.
² Disodium methylene-bis-thiopropionate.

The Viscurometer data (310° F.) on the resulting composition include a scorch ($T_s$) time of 2 minutes, optimum cure ($T_c$) in 10.8 minutes and a $\Delta T$ of 118 at $T_c$. The above data indicate a very rapid vulcanization. The torque vs. time profiles indicate a long flat plateau (flat cure) over the period 10 to 50 minutes or more.

I claim:

1. A vulcanizable composition comprising an intimate mixture of a rubbery, high molecular weight polymer of an epihalohydrin having a polyether structure in which there are repeating units of structure

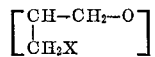

where X is a halogen atom of atomic weight greater than 19 with (a) a thioalkanoic curing agent selected from the class consisting of the acid and metal salt forms of a thioalkanoic acid having the structure

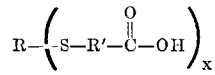

where X is a number at least 1, R is a radical selected from the class consisting of hydrogen when X=1 and multivalent organic bridging groups when X is greater than 1, and R' is an alkylidene hydrocarbon group wherein not more than two consecutively-connected carbon atoms intervene between the sulfur atom and the carbonyl carbon atom, said curing agent being present in proportions of from as little as 0.001 up to 0.03 mol for every 100 parts/wt. of said rubber polymer, (b) from about 1 to about 5 parts/wt. for every 100 parts by weight of said rubbery polymer of a tertiary amine ingredient having low volatility at mixing temperatures of up to 275° F., and when said ingredient (a) is the acid form, (c) from about 1 to about 10 parts/wt. per 100 parts/wt. of said rubbery polymer of a metal base compound selected from the class consisting of alkali metal carboxylates, polyvalent metal oxides and polyvalent metal salts of carboxylic acids.

2. The composition as claimed in claim 1 and further characterized by said rubbery polymer being a polymer of epichlorohydrin, by said ingredient (a) being a metal salt of a thioalkanoic acid as defined, and by said tertiary amine ingredient (b) being 1,4-diaza(2.2.2)bicyclooctane.

3. The composition as claimed in claim 1 and further characterized by said rubbery polymer being a polymer of epichlorohydrin, by said ingredient (a) being an alkali metal salt of a thioalkanoic acid as defined, and by said tertiary amine ingredient (b) being 1,4-diaza(2.2.2)bicyclooctane.

4. The composition as claimed in claim 1 and further characterized by said rubbery polymer being a polymer of epichlorohydrin, by said ingredient (a) being a lead salt of a thioalkanoic acid as defined, and by said tertiary amine ingredient (b) being 1,4-diaza(2.2.2)bicyclooctane.

5. The composition as defined in claim 1 and further characterized by said rubbery polymer being a homopolymer of epichlorohydrin, by said ingredient (a) being disodium thiodipropionate, and by said tertiary amine ingredient (2) being 1,4-diaza(2.2.2)bicyclooctane.

6. The composition as claimed in claim 1 and further characterized by said rubbery polymer being a copolymer containing from about 60 to 99%/wt. of combined epichlorohydrin and from 1 to about 40%/wt. of combined alkylene oxide, by said ingredient (a) being lead (II) methylene-bis-thiopropionate, and by said tertiary amine being 1,4-diaza(2.2.2)bicyclooctane.

7. The composition as claimed in claim 1 and further characterized by said rubbery polymer being a homopolymer of epichlorohydrin, by said ingredient (a) being 2-thioacetate lead (II), and by said tertiary amine ingredient (b) being 1,4-diaza(2.2.2)bicyclooctane.

8. A method of vulcanizing a rubbery, high molecular weight polymer of an epihalohydrin having a polyether structure in which there are repeating units of structure

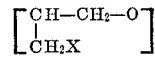

where X is a halogen atom of atomic weight above 19, comprising the steps of (1) mixing the said rubbery polymer with (a) a thioalkanoic curing agent selected from the class consisting of the acid and metal salt forms of a thioalkanoic acid having the structure

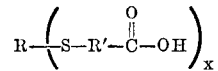

wherein X is a number of at least 1, R is a radical selected from the class consisting of hydrogen when X=1 and multivalent organic bridging groups when X is greater than 1, and R' is an alkylidene hydrocarbon group wherein not more than two consecutively-connected carbon atoms intervene between the sulfur atom and the carbonyl carbon atom, said thioalkanoic curing agent being present in proportions from as little as 0.001 up to 0.03 mol for every 100 parts/wt. of said rubbery polymer, (b) from about 1 to about 5 parts/wt. for every 100 parts/wt. of said rubbery polymer of a tertiary amine ingredient having low volatility at mixing temperatures up to 275° F., and when said ingredient (a) is the said acid form, (c) from about 1 to about 10 parts/wt. for every 100 parts/wt. of said rubbery polymer of a metal base compound selected from the class consisting of alkali metal carboxylates, polyvalent metal oxides and polyvalent metal salts of carboxylic acids and (2) heating the resulting mixture between about 300° and about 425° F. to effect vulcanization.

9. The method as defined in claim 8 and further characterized by said rubbery polymer being a polymer of epichlorohydrin, by said ingredient (a) being a metal salt of a thioalkanoic acid as defined, and by said tertiary amine ingredient (b) being 1,4-diaza(2.2.2)bicyclooctane.

10. The method as defined in claim 8 and further characterized by said rubbery polymer being a polymer of epichlorohydrin, by said ingredient (a) being a lead salt of a thioalkanoic acid as defined, and by said tertiary amine ingredient (b) being 1,4-diaza(2.2.2)bicyclooctane.

11. The method as defined in claim 8 and further characterized by said rubbery polymer being a homopolymer of epichlorohydrin, by said ingredient (a) being lead(II)-thiodipropionate, and by said tertiary amine ingredient (b) being 1,4-diaza-(2.2.2)bicyclooctane.

12. The method as defined in claim 8 and further characterized by said rubbery polymer being a copolymer containing from about 60% to about 99%/wt. of combined epichlorohydrin and from about 1 to about 40%/wt. of combined ethylene oxide, by said ingredient (a) being a lead salt of methylene-bis-thiopropionic acid, and by said tertiary amine ingredient being 1,4-diaza(2.2.2)bicyclooctane.

13. The method as defined in claim 8 and further characterized by said rubbery polymer being a homopolymer of epichlorohydrin, by said ingredient (a) being 2-thioacetato lead(II), and by said amine ingredient (b) being 1,4-diaza(2.2.2)bicyclooctane.

References Cited
UNITED STATES PATENTS

| | | | |
|---|---|---|---|
| 3,026,270 | 3/1962 | Robinson, Jr. | 260—2 |
| 3,026,305 | 3/1962 | Robinson, Jr. | 260—79.5 |
| 3,341,491 | 9/1967 | Robinson et al. | 260—45.75 |
| 3,414,529 | 12/1966 | Green et al. | 260—2 |

DONALD E. CZAJA, Primary Examiner

M. I. MARQUIS, Assistant Examiner

U.S. Cl. X.R.

260—18 EP, 18PT, 37 EP, 41 R, 79, 79.5 R, 79.5 C

UNITED STATES PATENT OFFICE
CERTIFICATE OF CORRECTION

Patent No. 3732174      Dated May 8, 1973

Inventor(s) PAUL P. NICHOLAS

It is certified that error appears in the above-identified patent and that said Letters Patent are hereby corrected as shown below:

Col. 2, line 19, "300-425°C" should read --300-425°F--.

Col. 7, line 15, "± 60" should read --±6°--; Example 1, in the table, Exp. 3, in the grouping under $\Delta T$, "163" should read --168--.

Col. 9, line 69, "the" should read --and--.

Signed and sealed this 2nd day of April 1974.

(SEAL)
Attest:

EDWARD M. FLETCHER, JR.
Attesting Officer

C. MARSHALL DANN
Commissioner of Patents